(12) United States Patent
Fernández López

(10) Patent No.: US 8,110,019 B2
(45) Date of Patent: Feb. 7, 2012

(54) MODIFIED INDUCTION FURNACE AND PROCESS FOR REMOVING ZINC-CONTAINING METALLURGICAL WASTE, WITH RECOVERY OF THE METALS THEREFROM

(75) Inventor: Miguel Fernández López, Madrid (ES)

(73) Assignee: Consejo Superior De Investigaciones Cientificas, Madrid (ES)

( * ) Notice: Subject to any disclaimer, the term of this patent is extended or adjusted under 35 U.S.C. 154(b) by 30 days.

(21) Appl. No.: 12/681,127

(22) PCT Filed: Oct. 3, 2008

(86) PCT No.: PCT/ES2008/070184
§ 371 (c)(1),
(2), (4) Date: Apr. 27, 2010

(87) PCT Pub. No.: WO2009/043961
PCT Pub. Date: Apr. 9, 2009

(65) Prior Publication Data
US 2010/0242675 A1 Sep. 30, 2010

(30) Foreign Application Priority Data

Oct. 4, 2007 (ES) ................................. 200702602

(51) Int. Cl.
*C22B 7/02* (2006.01)
*H05B 6/02* (2006.01)

(52) U.S. Cl. .......... 75/10.14; 75/10.19; 75/751; 75/770; 373/60; 373/73; 373/108; 373/138; 373/161; 373/163

(58) Field of Classification Search .................... 75/751, 75/770, 10.14, 10.19; 373/138, 73, 108, 373/60, 161, 163
See application file for complete search history.

(56) References Cited

U.S. PATENT DOCUMENTS

| 4,655,437 A | 4/1987 | Fritz et al. | |
|---|---|---|---|
| 5,030,274 A | 7/1991 | Ward | |
| 5,304,230 A * | 4/1994 | Steins et al. | 75/403 |
| 5,590,151 A | 12/1996 | Forestier | |
| 6,102,982 A * | 8/2000 | Isozaki et al. | 75/500 |

FOREIGN PATENT DOCUMENTS

| ES | 2018896 | 5/1991 |
|---|---|---|
| ES | 2034896 | 4/1993 |
| ES | 2192125 | 9/2003 |

OTHER PUBLICATIONS

International Search Report of PCT/ES2008/070184 mailed Feb. 3, 2009.

(Continued)

*Primary Examiner* — George Wyszomierski
*Assistant Examiner* — Tima M McGuthry Banks
(74) *Attorney, Agent, or Firm* — Merchant & Gould P.C.

(57) ABSTRACT

The present invention is based on a novel electric induction furnace design that enables the removal of zinc-containing filter dust (FD) originating from the production of steel (alloy or non-alloy) and the production of cast iron with galvanized steel scrap, using a novel process based on the carbothermal reduction of the metal oxides present in the FD, performed at the temperature at which the materials are melted inside the electric induction furnace. The electric induction furnace of the invention incorporates an electric arc or plasma beam generator to melt all the inorganic non-metallic material. The incorporation of this generator also enables the use of large volumes of molten slag.

12 Claims, 2 Drawing Sheets

OTHER PUBLICATIONS

Fernandez, et al, "Experiencia semindustrial de recuperacion de metales de residuos solidos de la produccion de acero inoxidable", Avances En Ciencia Y Tecnologia Del Acero Inoxidable 2, editors: J.A. Odriozola et al., Centro de Investigaciones Cientificas Isla de la Cartuja, Mar. 2003, 457-472.

* cited by examiner

MODIFIED INDUCTION FURNACE AND PROCESS FOR REMOVING ZINC-CONTAINING METALLURGICAL WASTE, WITH RECOVERY OF THE METALS THEREFROM

This application is a National Stage Application of PCT/ES2008/070184, filed 3 Oct. 2008, which claims benefit of Serial No. P200702602, filed 4 Oct. 2007 in Spain and which applications are incorporated herein by reference. To the extent appropriate, a claim of priority is made to each of the above disclosed applications.

FIELD OF THE ART

The present invention is based on a modified electric induction furnace and on a process that enables the removal of zinc-containing filter dust (FD) originating from the metallurgical industry.

Therefore, the invention falls within the metallurgical industry sector and, more specifically, the treatment of metallurgical waste, in addition to recovery of metals. This invention could also be used to recycle waste such as out-of-service tyres.

STATE OF THE ART

Filter dust (FD) is waste that originates from the production of steel and cast iron with galvanised steel scrap which, due to the amount produced worldwide, between 15 to 20 kg per ton of steel produced, represents a problem at global level. At present, this waste is removed through different processes, from deposit thereof at secure waste disposal sites to technologies aimed at recovering the metals it contains, at a different level of development.

The most widely accepted industrial FD-removal processes are the following:

Electric Arc Furnace (EAF) FD recycling. It is aimed at reducing the amount of FD generated per unit of steel produced and increasing, in turn, the zinc oxide content thereof. To this end, FD is re-introduced into the EAF in such a manner that a new, ZnO-enriched FD is generated, reducing the amount of FD to be removed (metals pass into steel, zinc into gases and non-reducible oxides into slag).

However, the use of this process has not become widespread in EAFs, as it generates more cost than savings due to the fact that:

It increases the consumption of coal and electric energy.
It produces white zinc oxide dust in the EAF work area.
It introduces a new cost, that of agglomeration of dust (or new equipment for insufflating dust in the molten EAF slag).
The cost of removing the new FD will continue to depend on the same removal company.

Waelz process. Currently the most widespread process worldwide, based on the carbothermal reduction of ZnO inside a rotary furnace at temperatures comprised between 1,200° C. and 1,350° C. (doughy state of the rotary furnace load). It requires high processing capacities to be economically feasible, handling of large amounts of slag, incorporation of additional operations for obtaining a higher-quality Waelz oxide destined for a very small market (zinc extraction industry). Its limitations are:

The profitability threshold of the process requires high processing capacity (>100,000 t/y).
It is not applicable to nickel and chrome-containing FD.
High cost of investment in means for controlling the discharge of gases originated by the process into the atmosphere.
Need to improve the quality of the Waelz oxide dust destined for sale.

Carbothermal solid-state reduction processes. There are FD removal processes at demonstration (and pilot) plant level based on carbothermal solid-state reduction (1,150-1,350° C.), after agglomerating the mixture and depositing the agglomerates on the rotary hearth of the furnace, heating these to the aforementioned temperature, with fossil fuel combustion gases (processes: Inmetco, Allmet, Fasmet and Comet). They produce pre-reduced ZnO with high iron content and a ZnO concentrate impurified with distilled materials as new FD. We must include the Primus process in this group, which does not agglomerate the FD, uses a multiple-hearth furnace and, as heating means, hot gases from fossil fuel combustion.

These carbothermal solid-state reduction processes require high-technology and high-capacity facilities and are not suitable for reducing chrome oxides, in addition to requiring electric melting equipment to produce metal from the reduced agglomerates. The Primus process has been aimed at steel production as an alternative to blast furnaces, also being technically feasible for FD removal.

Carbothermal melt-state reduction process. It is the most similar to that proposed herein, due to carrying out the recovery of metals and zinc separation by means of carbothermal melt-state reduction, for which it uses a tank furnace heated by several plasma generators (Plasmadust, Sweden), plasma-heated crucible furnaces (ILSERV, Terni, Italy), a graphite electrode, direct-current arc furnace (Fregenal de la Sierra, Badajoz, Spain) or three-phase alternating-current electric submerged arc furnace (BUS Varela, France). The industrial application of these plants is currently limited, exclusively, to nickel and chrome-containing FD originating from stainless steel production, not being economically feasible for treating nickel-free filter dust.

The limitations of the process are:
High electric energy consumption.
It produces new filter dust with a higher ZnO content but requires refining to improve its marketability.
The new ZnO-rich filter dust is impurified either with metals condensed upon volatilisation thereof in the arc furnace, with dust dragged by the gases, and/or by volatilisation of volatile compounds (alkalis, halides, etc.).

In summary, the FD-removal industrial activity is carried out worldwide mainly using the Waelz process, which does not have significant competitors for removing nickel-free EAF filter dust (except for inertisation and security waste disposal sites, processes which, in the short-medium term, will become prohibitively expensive to use). On one hand, it represents high costs for the generator (handling, transport, maintenance, and removal fee) and, on the other, it is currently difficult to find technological alternatives to those already mentioned, due to which FD removal has not yet been satisfactorily resolved.

The carbothermal reduction of melt-state filter dust could also be carried out using an electric induction furnace if means for melting non-metallic materials could be incorporated thereto, as its current design only allows melting of metallic materials.

The main constituent elements of electric induction furnaces are: (a) a coil formed from an internally water-cooled copper tube, (b) an alternating-current electric power supply connected at its terminals to the ends of the aforementioned coil, (c) a cylinder-shaped crucible formed from refractory material conveniently thermally insulated to house the molten metal, having at its upper end a loading mouth and pouring spout for the controlled emptying of the molten metal, (d) a folding closing lid for the loading mouth of the crucible, on the upper part of which the gas extractor hood of the furnace fume purification facility is disposed, (e) a tipping system for emptying the metal produced, (f) a water cooling system for the coil and flexible joining cables with the electric power supply and, in the channel-type electric induction furnace, (g) air fans for cooling the spiral channel part of the furnace, where the inductor coil and magnetic steel sheet core are also installed.

The electric induction furnace provides energy to the metallic load to be molten through the action of a variable magnetic field generated in the copper coil during passage of the alternating electric current, which penetrates the metallic load to be molten (in the case of a crucible electric induction furnace), inducing an electric current therein which heats the metal by the Joule effect until melting it.

In the case of channel-type electric induction furnaces, the variable magnetic field-generating inductor coil houses a toroid or frame-shaped sweet iron core in its interior, formed from a packet of magnetic steel sheets, electrically insulated from each other, which is in turn enveloped by another single-spiral coil contained in a channel made of refractory material, wherein the metal to be produced is molten and kept in that condition, the upper part of said coil being open to communicate with the furnace crucible, which houses all the liquid metal to be produced. The passage of an alternating current through the cooled copper coil induces an electron flow in the scrap metal or metal contained in the spiral channel that, by the Joule effect, heats the metal until melting it (created by the variable magnetic field guided through the sweet iron core common to both coils, which is surrounded by both); in turn, said molten metal heats and melts the metal contained in the molten metal receptacle or crucible, which is contact with the spiral channel coil, on being coated by the molten metal contained therein.

The present invention relates to a modified induction furnace and to a process that uses said furnace to remove the FD originating from the production of steel in electric arc furnaces (EAF) and cast iron with galvanised scrap in crucible electric induction furnaces (hereinafter IF).

On the other hand, out-of-service tyres (hereinafter OST) generate a large volume of non-biodegradable waste with a low load density and high calorific value (7,800-8,200 kcal/kg), the total elimination of which is very necessary, with the added difficulty that disposing of these in waste disposal sites, even cut up, is forbidden in developed countries.

Among the numerous processes studied and some industrially developed and implemented, we will only refer to that which is of interest to the invention, the distillation/pyrolysis thermal treatment applied to OSTs.

By means of this thermal treatment, which is carried out using oxygen-rarefied or oxygenless hot gases, applied to OSTs, three effluents are obtained: combustible gas comparable to natural gas, oils comparable to diesel oil, and a solid fraction comparable to coal ashes, composed of ZnO, steel filaments and silicates.

In the process proposed herein, mineral coal of the type low in ash, humidity and volatile material content is used to remove zinc-containing filter dust for carbothermal reduction treatment of the metal oxides present in the filter dust. This coal can be successfully substituted, if necessary and in the event of market demand, for the solid fraction obtained from OST distillation/pyrolysis, which has a very similar carbon content to that of the aforementioned mineral coal (>80% of carbon), with the added advantage that this fraction also contains zinc and steel, and the carbon gasified to CO and/or $CO_2$ is not accountable as a greenhouse gas, which increases its use value in this application, being equivalent in price to mineral coal, the recycling of which, on the other hand, is currently being incentivated by society.

DESCRIPTION OF THE INVENTION

Brief Description of the Invention

The present invention is based on three basic aspects:

A first aspect of the present invention is a modified electric induction furnace (hereinafter, electric induction furnace of the invention) wherein the following novel aspects have been incorporated:

i) A second lid that is moving and interchangeable with the conventional lid of the electric induction furnace itself, which facilitates the change in application thereof, that of removing zinc-containing FD by means of carbothermal reduction, to that of producing cast iron. This new lid has the necessary orifices to bring the material contained in the interior of the furnace into contact with the fume purification facility, with the agglomerate and coal feeding system, and with the molten coating bath control means.

ii) An electric arc or direct-current plasma beam generator, having (a) a vertically displaceable mobile cathode installed on the moving lid of i), formed from a graphite rod, and (b) an anode made of an electrically conducting material inserted into the furnace wall, in contact with the molten material.

iii) An additional capacity of the furnace crucible for containing a greater volume of molten material necessary for working with large amounts of slag.

A second aspect of the present invention is the zinc-containing FD removal process (hereinafter, process of the invention), characterised in that it is formed from i) a calcination of agglomerated non-coal mixed zinc-containing FD, at temperatures ranging between 900° C. and 1,100° C.; and ii) a subsequent carbothermal melt-state reduction of the agglomerated and calcined zinc-containing filter dust, carried out with coal in the electric induction furnace of the invention, which allows the use of the solid fraction obtained from OST distillation/pyrolysis.

A third aspect of the present invention is the use of both the furnace of the invention and the process of the invention in the removal of zinc-containing filter dust from steel production (alloy or non-alloy) and in the production of cast iron with galvanised steel scrap.

DESCRIPTION OF THE FIGURES

15. New interchangeable pivoting lid of the crucible induction furnace.
16. Crucible of the electric induction furnace.
17. Dry-installation of induction furnace fume filters or fume purification facility.
19. Spout for emptying the liquid metal.
20. Spout for emptying the liquid slag.
21. Supplementary crucible chamber for adding molten slag.
22. Molten slag.
23 Molten coating bath control means.

DETAILED DESCRIPTION OF THE INVENTION

Figure 1:
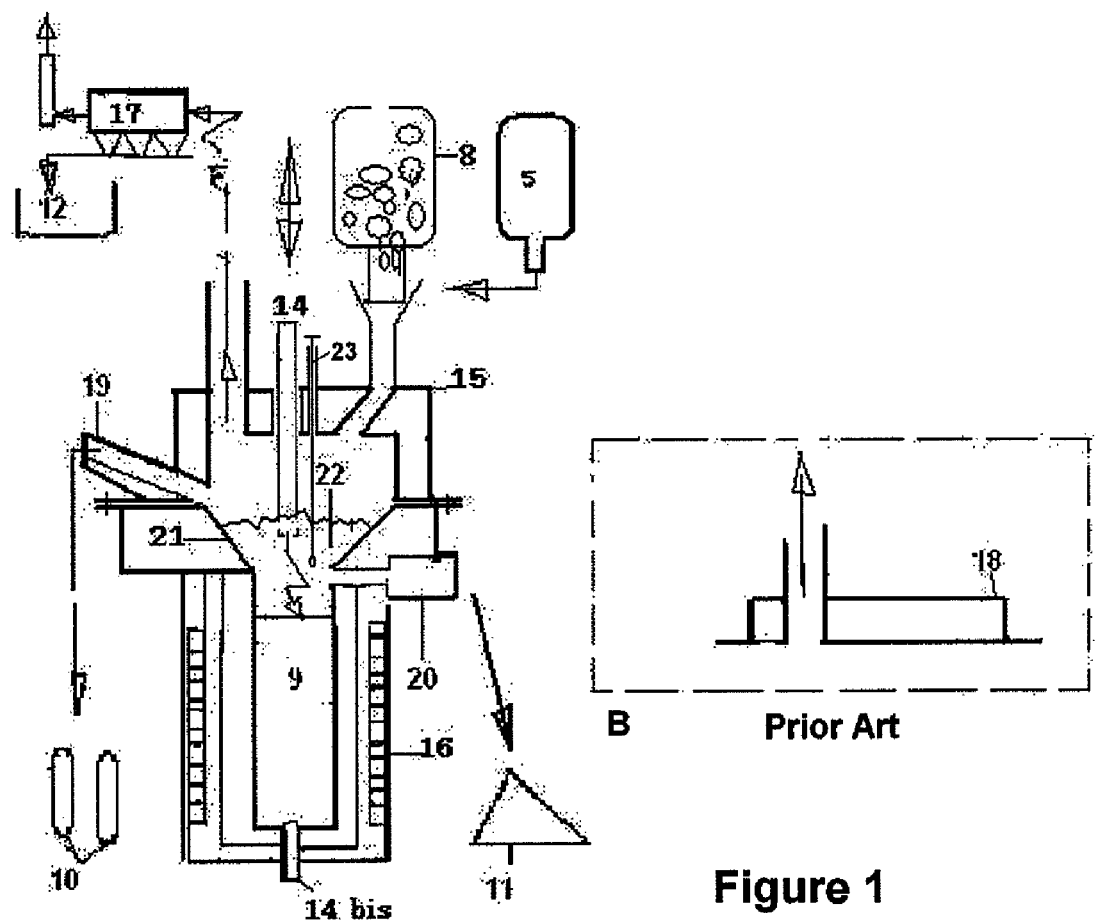
FIG. 1.
IV) Carbothermal melt-state reduction processing facilities.
B. Conventional lid of the crucible electric induction furnace.
5. Hopper for dosing of carbonaceous materials or coal feeding system.
8. Hopper for dosing of hot calcined agglomerated FD.
9. Molten metal.
10. Solid metal (chilled iron grit or of a special ferroalloy, cast iron parts, special ferroalloy ingot).
11. Granulated slag.
12. FD with a high ZnO content.
14. Direct-current electric arc or thermal plasma generator cathode.
14 bis. Direct-current electric arc or thermal plasma generator anode.

The present invention is based on a new electric induction furnace design that enables the removal of zinc-containing filter dust (FD) originating from the production of steel (alloy or non-alloy) and the production cast iron with galvanised steel scrap, using a process based on the carbothermal reduction of the metal oxides present in the FD, carried out at the temperature at which the materials are melted inside the electric induction furnace (1,500-1,600° C.). On melting the FD mixture with coal, metal is produced, new FD with gases and slag. Upon reduction with carbon of the oxides contained in the filter dust, metal is obtained, the volatilisable material passes into the gas phase due to the rise in temperature, together with non-condensable gases on reaching their volatilisation temperature, and the remaining non-reducible and non-volatilisable material will form the slag.

To this end, an electric induction furnace that incorporates an electric arc or plasma beam generator to melt all the non-metallic inorganic material has been designed, as conventional electric induction furnaces are unable to do so. The incorporation of this generator also allows the possibility of working with large volumes of molten slag (see A in FIG. 1).

Therefore, a first aspect of the present invention is a modified electric induction furnace (hereinafter, electric induction furnace of the invention), wherein the following novel aspects have been incorporated:

i) A second lid that is moving and interchangeable with the conventional lid of the electric induction furnace itself, which facilitates the change of application thereof, that of removing zinc-containing FD by means of carbothermal reduction, for that of producing cast iron. This new lid has the necessary orifices to bring the material contained in the interior of the furnace into contact with the fume purification facility, with the agglomerate and coal feeding system, and with the molten coating bath control means.

ii) An electric arc or direct-current plasma beam generator having (a) a vertically displaceable cathode installed on the moving lid of i), formed from a graphite rod, and (b) an anode made of an electrically conducting material inserted into the furnace wall, in contact with the molten material.

iii) Additional capacity of the furnace crucible for containing a greater volume of molten material necessary for working with large amounts of slag.

The electric arc generator cathode described in ii) is displaceable to control the electric power to be supplied to the load to be melted and be able to feed or initialise the arc, modifying its length.

A preferred aspect of the present invention is the electric induction furnace of the invention, characterised in that it is a crucible furnace.

A more preferred aspect of the invention is the crucible electric induction furnace, characterised in that it incorporates an additional pouring spout for the controlled emptying of the slag, whether by gravity or tipping.

Another more preferred aspect of the invention is the crucible electric induction furnace of the invention, characterised in that the additional capacity of the crucible iii) for containing a greater volume of molten material has a truncated cone-shaped axial cross-section.

Another preferred aspect of the invention is the crucible electric induction furnace of the invention, characterised in that the new slag pouring spout (IV) has a closing mechanism to keep it closed until the slag is emptied.

Another preferred aspect of the invention is the electric induction furnace of the invention, characterised in that it is a channel-type furnace.

The electric induction furnace of the invention enables the application of a new process, based on the prior calcination of agglomerated non-coal mixed zinc-containing FD, at temperatures ranging between 900° C. and 1,100° C., and the subsequent carbothermal melt-state reduction of the agglomerated and calcined zinc-containing filter dust carried out with carbon, in the electric induction furnace of the invention, at temperatures comprised between 1,500° C. and 1,600° C., at which the entire load of the electric induction furnace is molten.

Therefore, a second aspect of the present invention is the zinc-containing FD removal process (hereinafter, the process of the invention), characterised in that i) agglomerated non-coal mixed zinc-containing FD is calcined at temperatures ranging between 900° C. and 1,100° C., and ii) a subsequent carbothermal melt-state reduction of the agglomerated and calcined zinc-containing filter dust is carried out with coal in the electric induction furnace of the invention, which allows the use of the solid fraction obtained from OST distillation/pyrolysis.

This process entails the preliminary mixing and homogenisation of the FD with binders and fluxes, and cold agglomeration.

Figure 2:
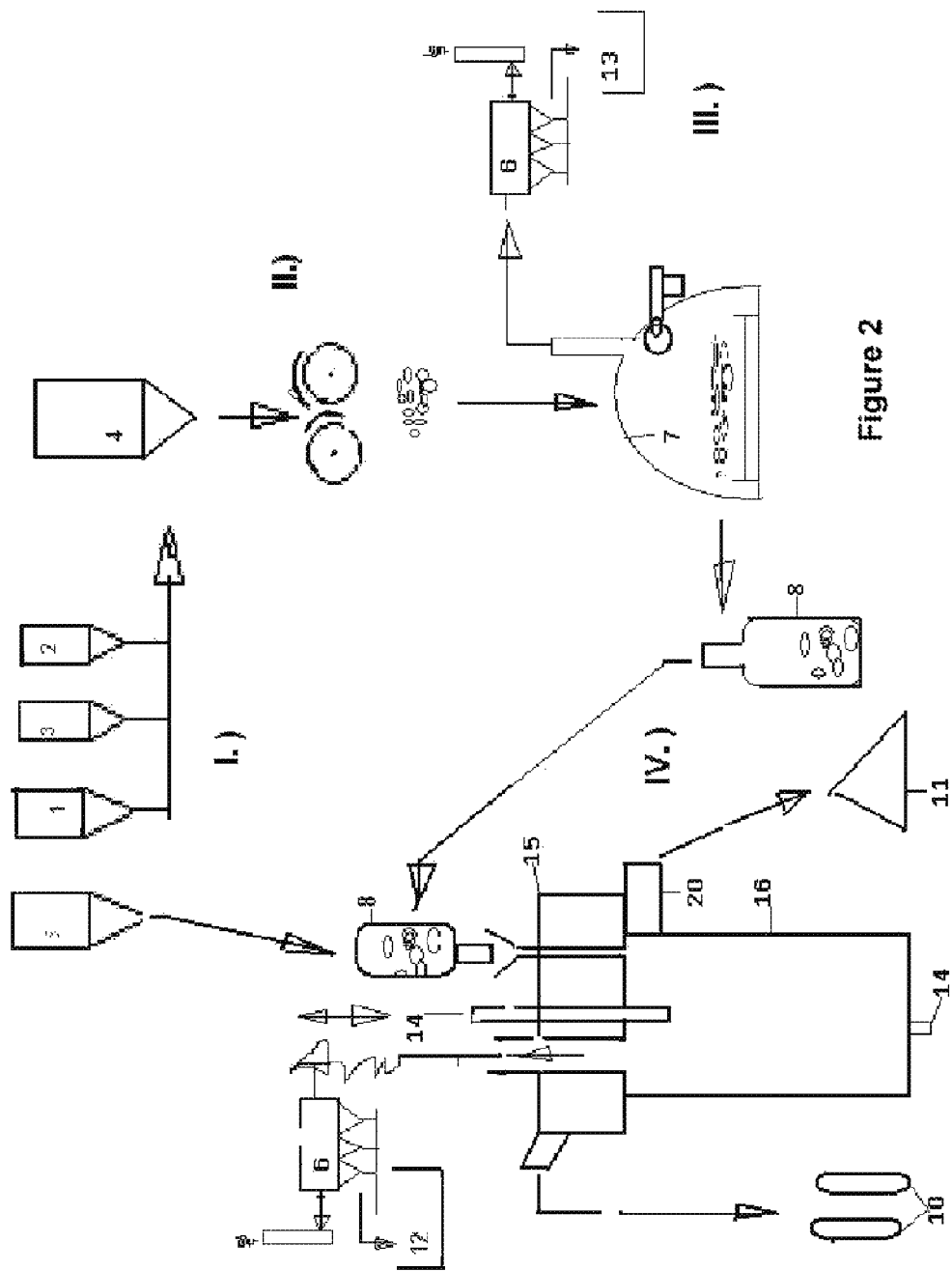
FIG. 2.
I) Facilities for homogenising and mixing FD with binder and flux.
1. Silo/hopper for dosing of FD.
2. Hopper for dosing of flux.
3. Hopper for dosing of binder.
II) Agglomeration facilities.
4. Dosing hopper for feeding the homogenised mixture to the agglomerator.
III) Facilities for calcination of agglomerates.
6. Facility for dry filtration of fumes.
7. Calcination furnace.
8. Receptacle for transferring the hot calcined agglomerates to the electric induction furnace.
13. Calcined FD.
IV) Melting facilities.
10. Solidified metal parts.
11. Granulated slag.
12. FD with a high ZnO content.
14. Electric arc or thermal plasma beam generator anode and cathode.
15. New interchangeable pivoting lid of the crucible induction furnace.
16. Crucible of the electric induction furnace.
20. Intermittent slag emptying spout.

The mixing and homogenisation stages have the object of producing a homogeneous mixture that will serve as loading material for the cold agglomeration equipment (II, FIG. 2). The mixing equipment (4, FIG. 2) and mixing materials intervene in these stages: FD (1, FIG. 2), flux (2, FIG. 2) and binder (3, FIG. 2). Mixing of the materials is carried out with the adequate relation of weights to: (a) produce agglomerate with low friability with the adequate mechanical characteristics for manipulation thereof (binder), and (b) obtain fluid slag at the melting temperature of metal during the melting operation (flux). The cold agglomeration stage of the mixing can be carried out using a pellet-forming disc and/or a press or briquetting rolls.

Calcination i) of the agglomerated non-coal mixed zinc-containing FD is aimed at separating the volatile compounds and reducing electric energy consumption during the subsequent carbothermal reduction ii) by discharging the hot agglomerates from the furnace at a temperature as close as possible to that of calcination.

Therefore, a preferred aspect of the present invention is the process of the invention wherein the hot transfer of the material produced during calcination i) to the modified electric induction furnace ii) is carried out using closed receptacles, conveniently thermally insulated and resistant to the calcination exit temperature i).

The calcination furnace (7, FIG. 2) will be similar to those used for brick firing in the ceramic and/or refractory industry, having a mobile hearth, roller path, moving trolleys, etc., in a circular or linear layout.

The calcination furnace fumes are directed towards their fume purification facility (6, FIG. 2), which is equipped with dry gas cleaning and filtering means, where the solids are separated and collected (13, FIG. 2), which constitute the waste to be removed.

The calcined agglomerate is discharged at a temperature as close as possible to that of calcination, in closed receptacles internally lined with a refractory material (8, FIG. 2), designed to keep them hot in the absence of air for an indefinite period of time and in order to be able to use them, where necessary, as dosing hoppers for loading the melting furnace (8, FIG. 1).

Carbothermal melt-state reduction of the agglomerated zinc-containing filter dust (IV, FIG. 2 and FIG. 1) is carried out in the electric induction furnace of the invention (A, FIG. 1), with the object of:
a) Recovering non-volatile metals from waste in molten state and/or special ferroalloy, depending on whether the processed FD originates from the production of carbon steel or drive steel and from special and/or stainless steels, respectively;
b) Volatilisation of zinc metal, upon reduction of ZnO, with the carbon of the load, and also of the volatile compounds not removed during calcination; and
c) Scorification of the remaining compounds.

The operating temperature of the furnace will be comprised between 1,500° C. and 1,600° C., at which the melting, oxide carbothermal reduction, non-metal scorification and volatile compound volatilisation operations are carried out effectively and quickly, improving further with the use of a direct-current electric arc generator (or, alternatively, a plasma beam generator), which also enables melting of slag.

The carbothermal melt-state reduction of the zinc-containing filter dust starts when the material contained in the crucible (9, FIG. 1) is liquid and at the desired temperature, and in an amount exceeding its capacity by 70%, in the case of the crucible electric induction furnace. The agglomerates, upon immersion in the molten material (9, FIG. 1), are heated and melted by contact therewith. The molten material that is in contact with the agglomerate of the melting process is renewed and heated by agitation caused by electromagnetic induction in the liquid metal coating bath by and, simultaneously, the slag (11, FIG. 1) accumulates in an unmolten state on the surface of the molten material, on being transparent to heating by induction.

In order to melt it, the electric induction furnace is equipped with a direct-current electric arc (or plasma beam) generator, with its electrodes (14 and 14 bis, FIG. 1), disposed as indicated in A of FIG. 1, to create an arc aimed at the slag. The arc heats and melts the slag by radiation, and keeps it molten.

The oxide reduction reactions susceptible to being produced in the slag and its contact area with the molten metal are:

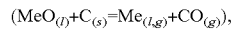

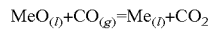

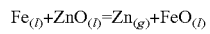

where MeO is the metal oxide, Me the metal, C the carbon of the coal or molten metal and CO and $CO_2$ the carbothermal reduction gases. These, upon flowing out, penetrate the slag, making it spongy and increasing its volume, whereupon: a) a larger surface area of the arc radiation crucible wall is protected, and b) the passage of parts through the slag and decanting of metal drops are enabled.

As the cycle advances, the amount of accumulated slag increases and must be emptied on reaching the pre-established volume. This is carried out by gravity through a second pouring spout (20, FIG. 1), disposed on the lower part of the expanded truncated cone-shaped cross-section of the crucible, and having a truncated cone-shaped ceramic plug-type closing mechanism.

The gases and distillates produced during melting are sent to the furnace fume purification facility (17, FIG. 1) for dry cleaning and filtering, in the filters of which the solids are collected (12, FIG. 1), being mainly ZnO with scarce presence of volatile compounds, due to having been separated to a large extent during calcination.

The molten metal that accumulates in the crucible as melting progresses (9, FIG. 1) is of the cast iron type, alloy or non-alloy, and increases its level parallel thereto, whereupon it is initially emptied by tipping, on reaching the crucible's nominal capacity, for which the mobile lid must first be interchanged (15, FIG. 1A) with the conventional lid (18, FIG. 1B). Emptying of the metal (19, FIG. 1) concludes when approximately 30% of its volume has been emptied, which allows melting of agglomerates to be immediately resumed.

Upon conclusion of the melting and lid interchange, the electric induction furnace may be operated in the conventional manner, applying the necessary metallurgy to obtain the desired cast iron or special ferroalloy product (10, FIG. 1) (deoxidation, adjustment of composition and temperature).

The possibility of interchanging the conventional lid with the second additional moving lid also allows the plant to double its treatment capacity, in the event of having an electric induction furnace (one would be dedicated to metal refining and the other to melting agglomerates), without doubling the investment and with the same fixed plant costs.

The coal used in the carbothermal melt-state reduction of the zinc-containing FD may originate from the solid fraction obtained from OST distillation/pyrolysis, at temperatures comprised between 400° C. and 600° C., given the similar composition and due to containing zinc and steel, said possibility of using this additional reducing agent being a preferred aspect of the present invention.

The feasibility of using the solid fraction obtained from OST distillation/pyrolysis in said application has been demonstrated in laboratory tests involving the reduction of slag with a high iron oxide content under a nitrogen atmosphere using carbon black, the solid fraction obtained from OST distillation/pyrolysis and coal at temperatures comprised between 1,000° C. and 1,580° C.

The high temperatures used in the carbothermal reduction of metal oxides in melted slag (>1,550° C.) favour coal-driven metal oxide reduction reactions, on increasing the value of the free energy that reacts with the temperature exponentially, including the case of low-reactivity coals.

This possible use of the solid fraction obtained from OST distillation between 400° C. and 600° C., during carbothermal reduction, would favour OST recycling as an alternative or complementary recycling means to its generally accepted use in cement factories as fuel which, in the case of implementing the process as a reducer in the invention, would require the same or larger amounts of OSTs as those required by cement factories, given the large volume of zinc-containing filter dust generated by iron and steel industries.

Based on the foregoing, the present invention provides equipment and a process for managing zinc-containing filter dust, based on the carbothermal reduction over a coating bath of slag and metal melted using a modified electric induction furnace, and minimising the resulting volume of waste to be eliminated.

This process has the advantages of thermal and metallurgical efficiency, in addition to a low cost of application, due to the fact that:

It minimises the use and consumption of electric energy.

It obtains FD comparable to high-purity ZnO concentrate (>80% and with a low alkali and halide content).

It preferably uses the solid fraction of OSTs, if existing in the market, although it can also use coal, for the carbothermal melt-state reduction of the metal oxides present in zinc-containing FD.

It allows the production of finished foundry products.

It does not require facilities with high processing capacity.

Therefore, a third aspect of the present invention is the use of both the furnace of the invention and the process of the invention for the removal of zinc-containing filter dust (FD) originating from the production of steel (alloy or non-alloy) and the production of cast iron with galvanised steel scrap.

Example of Embodiment of the Invention

The nature of zinc-containing FD and metal oxide-reducing agents thereof.

Table I shows the chemical composition of real samples of zinc-containing FD originating: from the production of stainless steel (Column A) and the production of carbon steel using electric arc furnaces (Column B).

Here we can observe the existence of carbon-reducible metal oxides ($Fe_2O_3$; MnO, $Cr_2O_3$, NiO, ZnO, CuO, $MoO_3$, part of $SiO_2$) and volatilisable compounds ($K_2O$, $Na_2O$, Cl, PbO, CdO, $SO_2$ and fluorides).

The columns "Coal" and C) of Table I include the immediate analyses of anthracite coal and the solid fraction obtained from OST distillation. The coal corresponds to that used in the present invention as a reducer in the removal of FD originating from the production of stainless steel by means of carbothermal melt-state reduction. The carbonaceous fraction corresponds to an average analysis of pyrolysis-recycled OSTs used in the present invention in reducibility laboratory tests applied to oxidised slag at different temperatures.

TABLE I

Components as a % by weight of two samples of zinc-containing FD (columns A) and B)) and a sample of carbon mineral ("Coal" column) and solid fraction obtained from OST pyrolysis (Column C).

| Component | A) | B) | Coal | C) |
|---|---|---|---|---|
| $Fe_2O_3$ | 35.5 | 27.6 | 1.2 | 1.6 |
| NiO | 1.17 | — | — | — |
| $Cr_2O_3$ | 14.6 | 0.3 | — | — |
| MnO | 2.5 | 2.6 | — | — |
| $MoO_3$ | 0.1 | | | — |
| ZnO | 20.5 | 27.5 | | 6.5 |
| PbO | 0.8 | 4.3 | | — |
| CaO | 4.5 | 7.0 | | 1.1 |
| $SiO_2$ | 9.7 | 3.9 | 4.0 | 2.5 |
| MgO | 4.2 | 1.8 | | 0.25 |
| $Al_2O_{33}$ | 0.4 | 0.8 | 2.0 | 0.2 |
| C | 0.3 | 2.8 | 82.5 | 82.2 |
| $SO_3$ | 0.5 | 3.9 | 0.9 | 3.4 |
| F | 1.0 | 0.7 | — | 0.01 |
| PxCal | 3.8 | 15.2 | | |
| CuO | 0.2 | 0.4 | | — |
| Volat. Mat. | | | 6.5 | 4.1 |

Row "PXCal" refers to losses due to calcination.

We must point out the difference in composition between the two carbonaceous materials (two last columns of the table), the high content of zinc and SO3 of the carbonaceous fraction (Column C), which is normally accompanied by steel filaments, if not previously separated.

Calcination Stage of the Process of the Invention

The FD of columns A) and B) of Table I were subjected to calcination at 1,000° C., obtaining the compositions shown in columns A)Cal. and B)Cal. of Table II. Therefore, Table II shows the composition of two zinc-containing FD, A) and B), before and after being calcined at 1,000° C., B)Cal. and C)Cal.

TABLE II

| Component | A) | A) Cal. | B) | B) Cal. |
|---|---|---|---|---|
| $Fe_2O_3$ | 35.5 | 37.1 | 27.6 | 34.8 |
| NiO | 1.17 | 1.24 | — | — |
| $Cr_2O_3$ | 14.6 | 15.4 | 0.3 | 0.4 |
| MnO | 2.5 | 2.6 | 2.6 | 3.3 |
| $MoO_3$ | 0.1 | 0.1 | | |
| ZnO | 20.5 | 19.1 | 27.5 | 30.2 |
| PbO | 0.8 | 0.0 | 4.3 | 0.1 |
| CdO | 0.04 | 0.01 | 0.06 | — |
| CaO | 4.5 | 5.7 | 7.0 | 10.8 |
| $SiO_2$ | 9.7 | 11.8 | 3.9 | 10.4 |
| MgO | 4.2 | 5.5 | 1.8 | 2.4 |
| $Al_2O_{33}$ | 0.4 | 0.7 | 0.8 | 1.8 |
| C | 0.3 | 0.0 | 2.9 | 0.0 |
| $SO_3$ | 0.5 | 0.0 | 3.9 | 3.1 |
| F | 1.0 | 0.0 | 0.7 | 0.0 |
| Cl | 1.30 | 0.0 | 5.7 | 0.0 |
| CuO | 0.2 | 0.2 | 0.4 | 0.1 |
| PxCal | 3.8 | | 15.2 | |

In Table II we can observe how calcination of said FD at 1,000° C. produces gasification, total or partial, of the volatile compounds, either directly or after thermally decomposing into other volatiles. Therefore, we can observe that calcination FD A) and B) causes a reduction in its initial components, C, K2O, Na2O, PbO, CI, F, CdO and SO3, in such a manner that they disappear or decrease considerably in the composition of the calcined FD. The other FD compounds, Fe2O3, ZnO, MnO, NiO and Cr2O3, increase in the composition. These results confirm the need to perform calcination prior to carbothermal liquid-state reduction in order to remove these volatile compounds, preventing said compounds from: i) consuming electric energy for melting in the electric induction furnace and ii) impurifying the ZnO, as the volatile compounds do not enter the melting furnace load.

Based on these results, the inventor of the present invention has incorporated stage i), calcination of the agglomerated non-coal mixed zinc-containing FD, of the process of the invention. On the other hand, the amount of volatile compounds present in the FD that is gasified during calcination increases with the temperature at which it is carried out, due to which the calcination must be carried out at the highest possible temperature in order to reduce the amounts and presence of volatile compounds during the melting treatment, but avoiding reaching the melting point of the rest of the FD components.

In order to optimise the calcination temperature of stage i) of the process of the invention, calcination tests were carried out on samples of zinc-containing FD originating from the production of carbon steel, at temperatures of 950° C., 1,000° C. and 1,050° C., the results of which revealed that: a) the volatilisations increased with the temperature and b) as of a certain calcination temperature, if it continues rising, the increased loss of volatilisable impurities that could justify the increase in required energy consumption is not achieved. The corresponding results are shown in Table III, together with the composition of the FD used in the calcination tests (Column A)).

TABLE III

Results of the calcination of zinc-containing FD A) originating from the production of carbon steel, carried out at 950° C., 1,000° C. and 1,050° C. (as a % by weight).

| Component | A) | A) Cal. at 950° C. | A) Cal. at 1,000° C. | A) Cal. at 1,050° C. |
|---|---|---|---|---|
| $Fe_2O_3$ | 33.9 | 39.2 | 40.4 | 41.8 |
| MnO | 2.4 | 2.8 | 3.2 | 3.3 |
| ZnO | 26.4 | 28.3 | 32.6 | 32.3 |
| PbO | 4.6 | 0.3 | 0.1 | 0.0 |
| CaO | 7.2 | 9.5 | 11.6 | 11.5 |
| $SiO_2$ | 4.4 | 5.2 | 6.2 | 6.3 |
| MgO | 1.3 | — | 1.4 | 1.7 |
| $Al_2O_3$ | 0.8 | 1.0 | 1.0 | 0.9 |
| C | 1.3 | — | — | — |
| $SO_3$ | 2.6 | 3.4 | 3.1 | 2.9 |
| $Na_2O$ | 5.0 | 2.7 | 0.6 | 0.0 |
| $K_2O$ | 2.5 | 1.6 | 0.6 | 0.5 |
| Cl | 5.0 | 2.0 | 0.0 | 0.0 |
| F | — | — | — | — |
| PxCal. | | 10.45 | 12.5 | 12.8 |
| CuO | 0.5 | 0.4 | 0.3 | 0.2 |

These results demonstrate that for this specific FD, the optimum temperature range of the calcination stage i) of the process of the invention is comprised between 1,000° C. and 1,100° C. The optimum range can be modified in accordance with the composition of the FD used.

Carbothermal Reduction Over Melted Slag Stage of the Process of the Invention

Using a 3 MW direct-current electric arc furnace, removal of non-agglomerated and non-calcined zinc-containing FD originating from the production of austenitic stainless steel was carried out, using the carbothermal reduction with coal over melted slag technique. The average composition of said FD is shown in Column B) of Table IV. This table shows the average values corresponding to the compositions of the metal, slag and new ZnO-enriched FD calculated based on the results obtained from twenty carbothermal reduction tests carried out on three tons of FD in each case.

TABLE IV

Results of carbothermal reduction of zinc-containing FD originating from the production of stainless steel and carried out using electric-arc energy. The average compositions of the zinc-containing FD, B), of the coal used, and of the metal, slag and new FD obtained are shown.

| Components | B) | Coal | Metal (1) | Slag | New FD |
|---|---|---|---|---|---|
| $Fe_2O_3$ | 32.2 | 1.2 | 60.9 | 3.8 | 8.9 |
| $Cr_2O_3$ | 14.6 | | 21.0 | 5.9 | 3.2 |
| MnO | 4.2 | | 3.1 | 7.2 | 4.2 |
| NiO | 2.8 | | 5.2 | 0.2 | 1.2 |
| $MoO_3$ | 0.9 | | 2.0 | — | — |
| ZnO | 14.5 | | — | — | 41.1 |
| PbO | 1.4 | | — | — | 4.2 |
| CaO | 7.8 | | — | 24.4 | 5.2 |
| SiO2 | 6.3 | 4.0 | 1.1 | 30.1 | 5.8 |
| MgO | 5.1 | | — | 15.7 | 6.7 |
| Al2O3 | 0.6 | 2.0 | — | 7.7 | 2.8 |
| C | 0.5 | 82.5 | 4.9 | — | |
| $K_2O$ | | 0.9 | | | 3.4 |
| $Na_2O$ | | — | | | 2.3 |
| CdO | | | | | 0.5 |
| S | 0.4 | | 0.1 | 1.0 | 0.7 |
| PxCal. | | 6.5 | | | |

B) Stainless steel FD
(1) The components are elements, not oxides; for example, Fe2O3 is Fe (iron).

In Table IV we can observe that, during carbothermal reduction of zinc-containing FD using coal and carried out using electric-arc energy:

1. Metals are obtained from the oxides (Fe, Cr, Ni, Mo, Mn), even from chromite, which very few processes can achieve, on being a refractory oxide.
2. ZnO is also reduced and we can observe that it is only contained in the new FD, as ZnO, after previously having passed to zinc metal (at FD melting temperature, between 1,500° C. and 1,600° C.; the zinc metal obtained from the reduction of oxide by coal passes into gas (907° C.), where it is re-oxidised to ZnO).
3. The metal obtained has high carbon content, with nickel and chrome, as a consequence of carrying out the reduction of the metal oxides with coal, due to which it is called special ferroalloy.
4. The new filter dust has a net increase in ZnO content with respect to the initial FD, in addition to volatile compounds from the initial FD (K2O, Cl, Na2O, PbO, and CdO), due to which the new FD is a very impure ZnO concentrate.

These results led us to choose the electric arc as the means for providing the energy to carry out carbothermal reduction over melted slag. Incorporating this electric arc over an electric induction furnace has the following advantages: 1) the excellent thermal efficiency of the heating of the molten metal, 2) greater flexibility on maintaining the molten state for long periods of time without consuming large amounts of energy, 3) improved thermal efficiency of electric arc melting, as the solid being melted is coated, as it falls, by the molten metal contained in the crucible of the electric induction furnace, and 4) being able to produce finished cast iron products with the desired qualities and in the desired amounts. These advantages result in less removal costs and higher metal value, which reduces dependence on economies of scale in terms of process capacity, as it can be disposed next to the filter dust generator.

If volatile compounds were not present in the FD (in the case of using calcined FD such as that of Tables II and III), the ZnO obtained would be purer.

Having carried out the carbothermal reduction treatment on the non-agglomerated filter dust entails obtaining a new FD more impoverished in Zn than expected, due to the presence of unmolten FD particles. This can be observed in the composition of the new FD shown in the last column of the table, as it contains substantial amounts of Cr2O3, Fe2O3, NiO, MnO, CaO, MgO, SiO2, Al2O3, etc., the presence of which can only be justified as having been dragged by the fumes.

If FD is agglomerated and calcined, prior to carbothermal reduction thereof, a new FD with a high ZnO content is obtained, as the process of the invention substantially reduces the presence of volatile materials in the FD to be melted and also due to being agglomerated.

The invention claimed is:

1. A modified induction furnace for removing zinc-containing filter dust, comprising:
    i) a second lid that is moving and interchangeable with a first lid of an electric induction furnace itself, having the necessary orifices to bring the material contained inside the furnace in contact with a fume purification facility, with an agglomerate and coal feeding system, and with a molten coating bath control means;
    ii) an electric arc or direct-current plasma beam generator, having
        (a) a vertically displaceable mobile cathode installed on the moving second lid itself, formed from a graphite rod, and
        (b) an anode made of an electrically conducting material inserted into the furnace wall, in contact with a molten material;
    iii) additional capacity of the furnace crucible for containing a greater volume of molten material necessary for working with large amounts of slag.

2. A modified induction furnace, according to claim 1, wherein it is a crucible furnace.

3. A modified induction furnace, according to claim 2, further comprising an additional pouring spout that enables controlled emptying of the slag.

4. A modified induction furnace, according to claim 3, wherein the pouring spout has a closing mechanism to keep it closed until the slag is to be emptied.

5. A modified induction furnace, according to claim 2, wherein the additional capacity of the crucible (iii) to contain a larger volume of molten material has a truncated cone-shaped revolving axial cross-section.

6. A modified induction furnace, according to claim 1, wherein it is a channel-type furnace.

7. A process for removing zinc-containing filter dust, which comprises:
    i) a calcination of an agglomerated and non-coal mixed zinc-containing filter dust at a temperature ranging from about 900° C. to about 1,100° C., and
    ii) a subsequent carbothermal melt-state reduction of the agglomerated and previously calcined zinc-containing filter dust, carried out with coal, in the electric induction furnace of claim 1.

8. A process for removing zinc-containing filter dust, according to claim 7, wherein a hot transfer of the material produced during calcination
    i) to the modified electric induction furnace
    ii) is carried out using closed receptacles, conveniently thermally insulated and resistant to the calcination i) exit temperature.

9. A process for removing zinc-containing filter dust, according to claim 7, wherein the coal used in the carbothermal reduction ii) is substituted for solid fractions obtained from out-of-service tyre distillation.

10. The process of claim 7, which further comprises removing metallurgical waste.

11. The process of claim 7, which further comprises removing zinc-containing filter dust (FD) originating from the production of alloy or non-alloy steel and the production of cast iron with galvanized steel scrap.

12. The process of claim 7, wherein zinc-containing filter dust (FD) originates from the production of alloy or non-alloy steel and the production of cast iron with galvanized scrap steel.

* * * * *